United States Patent [19]

Licht

[11] 4,219,293
[45] Aug. 26, 1980

[54] WORKPIECE PERFORATING MACHINE

[76] Inventor: Anthony J. Licht, 329 Custer, Sandusky, Mich. 48471

[21] Appl. No.: 942,674

[22] Filed: Sep. 15, 1978

[51] Int. Cl.³ .................. B23B 35/00; B23B 39/20; B23B 41/00
[52] U.S. Cl. .................. 408/1 R; 408/32; 408/34; 408/35; 408/126
[58] Field of Search .................. 408/35, 126, 32, 33, 408/34, 1

[56] References Cited

U.S. PATENT DOCUMENTS

| 708,177 | 9/1902 | Sherman | 408/32 X |
| 983,395 | 2/1911 | Ogle | 408/126 |
| 1,044,564 | 11/1912 | Orth | 408/32 |
| 3,877,831 | 4/1975 | Maroshak | 408/32 |
| 3,899,265 | 8/1975 | Lang | 408/50 |
| 3,910,713 | 10/1975 | Maroshak | 408/1 |
| 3,957,386 | 5/1976 | Lupke | 408/50 |

Primary Examiner—Z. R. Bilinsky
Attorney, Agent, or Firm—Ian C. McLeod

[57] ABSTRACT

A machine for perforating workpieces, particularly corrugated plastic drain pipe or tile, to produce holes using drills is described. Multiple drills are radially mounted on a guide wheel so that the individual drills are sequentially extendable from the periphery of the guide wheel into the workpiece as the guide wheel rotates against a surface of the workpiece. A motor rotates a drive disc which as the guide wheel rotates sequentially contacts a cylindrical bushing on each drill to extend and rotate the drill into the work surface to create a perforation or hole and the drill is then extracted from the perforation by the rotation of the guide wheel.

12 Claims, 9 Drawing Figures

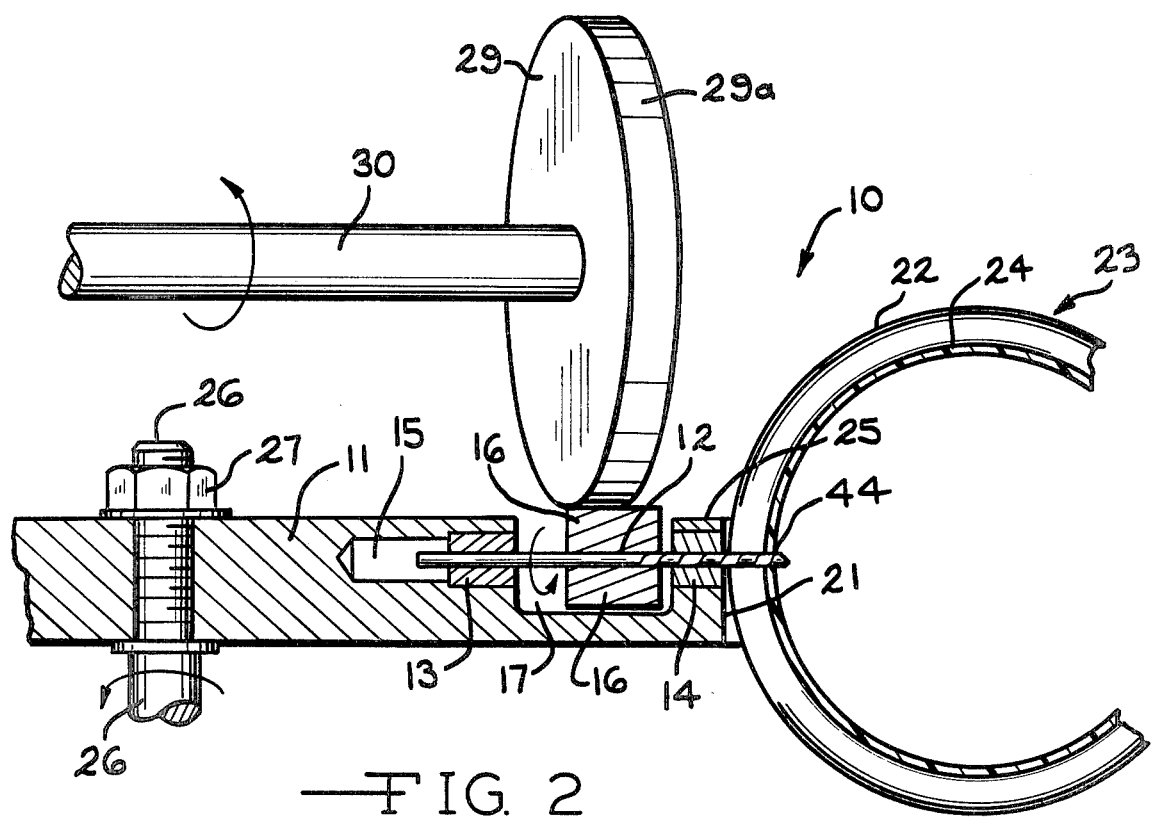
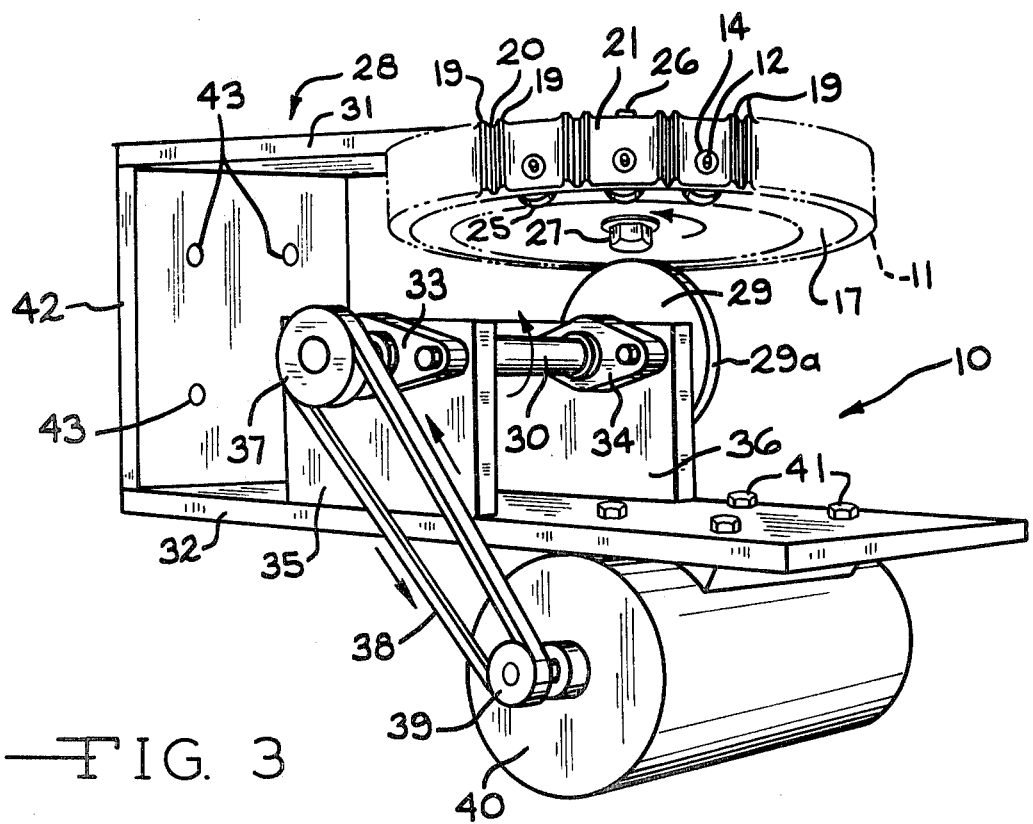

WORKPIECE PERFORATING MACHINE

BACKGROUND OF THE INVENTION

1. Field of the Invention

The present invention relates to a machine for perforating a workpiece, particularly a pipe, to produce a hole. In particular, the present invention relates to a machine wherein a single motor sequentially rotates and extends multiple drills.

2. Description of the Prior Art

The principal prior art in relation to perforating plastic corrugated drain tile is described in U.S. Pat. Nos. 3,899,265; 3,957,386 and 3,910,713. All of the machines described in these patents are relatively expensive to construct since each drill requires a separate motor and electrical control circuitry.

SUMMARY OF THE INVENTION

The present invention relates to an improvement in a machine for drilling holes in a workpiece and including a frame for supporting the workpiece which comprises: a guide wheel which rotates on a central axis with a peripheral surface positioned so as to be in surface contact with the workpiece as the workpiece advances through the frame; at least one drill mounted on a radial axis from the central axis of the guide wheel such that the drill is rotatable and extendable into and retractable from a workpiece from the periphery of the guide wheel; a cylindrically surfaced driven bushing fixedly mounted on each drill around a radial axis; and a rotatable powered drive disc mounted on the frame having an axis of rotation so that the disc periodically frictionally engages the bushings to extend and rotate the drill into the workpiece as the guide wheel rotates and then to disengage so that the drill is extracted from the hole drilled in the workpiece.

The present invention particularly relates to an improved machine for drilling holes in corrugated tubing including a frame for supporting the tubing on its longitudinal axis which comprises: at least one guide wheel which rotates on a central axis mounted on the frame with the central axis of rotation perpendicular to the longitudinal axis of the tubing as supported on the frame and with a peripheral surface with projections on the guide wheel which cooperate with the tubing corrugations to provide alignment of the tubing with the guide wheel during rotation; a plurality of rotatable drills journalled on radial axes from the central axis and at equal angles around the guide wheel so as to be extendable and retractable from between the projections on the guide wheel into the tubing; cylindrically surfaced driven bushings fixedly mounted on each of the drills around a radial axis; a rotatable powered drive disc mounted on the frame so that the disc sequentially frictionally engages the drill bushings as the guide wheel is rotated to extend and rotate each drill into the pipe and then to disengage the disc from each bushing so that the drill is extracted from the hole.

It is thus an object of the present invention to provide a machine with at least one drill radially mounted on a guide wheel which is sequentially extended from the periphery of the wheel using a motor with a rotating disc which contacts a bushing on the drill at an angle to rotate and extend the drill from the periphery of the guide wheel. The machine is particularly adapted to using a single disc to sequentially extend and rotate multiple drills. It is further an object of the present invention to provide a machine which is particularly adapted to drilling plastic corrugated drain tile or pipe and which is relatively inexpensive to construct and operate by comparison to prior art machines. These and other objects will become apparent by reference to the following description and the drawings.

BRIEF DESCRIPTION OF THE DRAWINGS

FIG. 2 is a front cross-sectional view of the guide wheel assembly and drain tile shown in FIG. 1 along line 2—2.

FIG. 3 is a front perspective view illustrating one version of a complete guide wheel assembly shown in part in FIGS. 1 and 2 including the motor and parts for mounting and rotating the drive disc.

SPECIFIC DESCRIPTION OF THE PREFERRED EMBODIMENT

Figure 1:
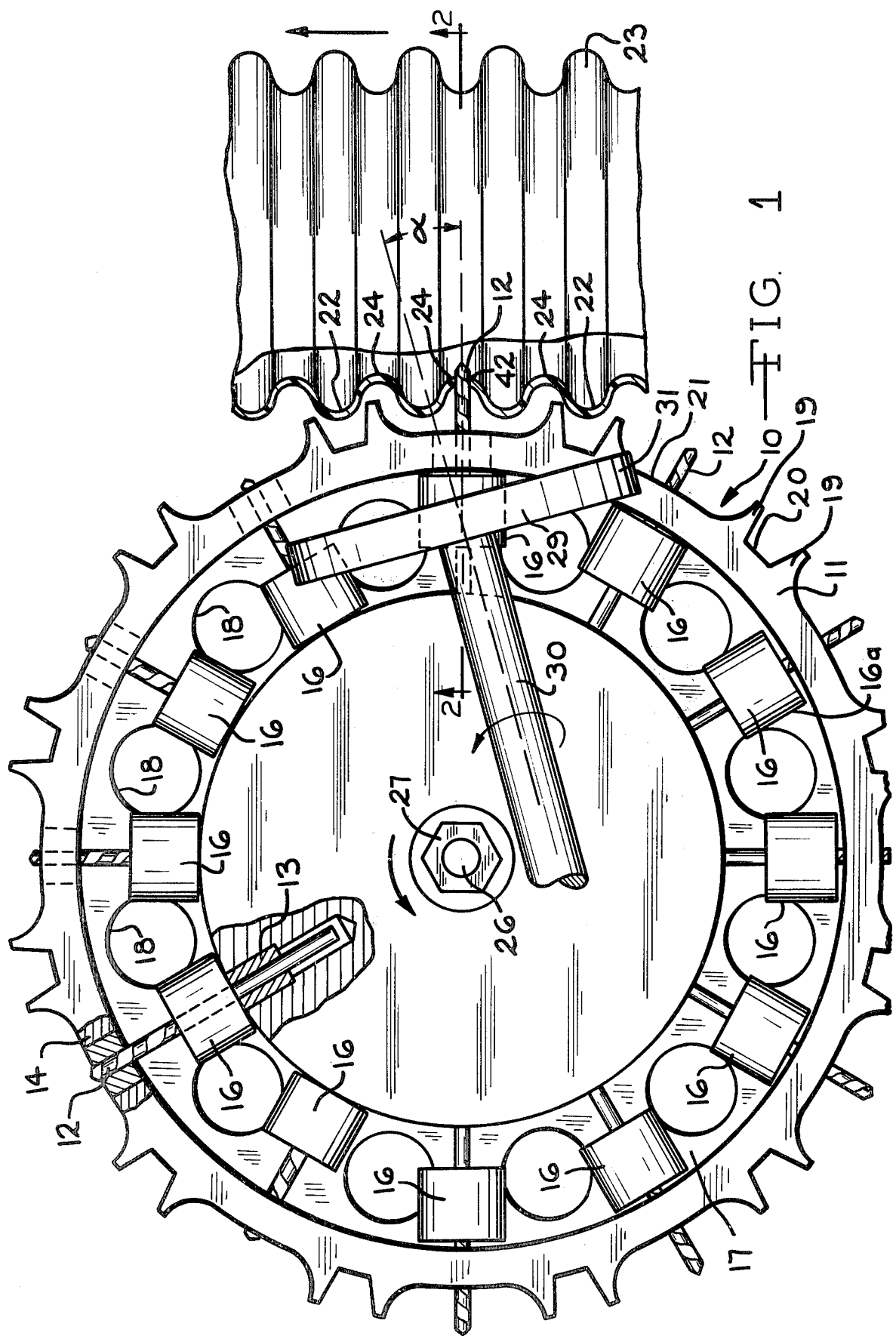
FIG. 1 is a plan view of a guide wheel in partial section in contact with a corrugated drain tile also shown in partial section and particularly illustrating a guide wheel supporting plural radially mounted drills with bushings on each drill which sequentially contact an angled drive disc as the guide wheel rotates.

FIGS. 1 and 2 illustrate the preferred form of the guide wheel assembly 10 of the present invention. A guide wheel 11 mounts drills 12. The drills 12 are journalled on bearings 13 and 14 mounted on wheel 11. A radial recess 15 in the wheel 11 behind the drill 12 allows for longitudinal axis movement of the drill 12. A driven bushing 16 is fixed to the drill 12 in a slot 17 in the wheel 11. Holes 18 are provided through the sides of the wheel 11 to allow for discharge of chips from the drills 12. The wheel 11 is provided with peripheral gear teeth 19 forming valleys 20 and 21. The valley 20 mates with spaced corrugations 22 on drain tile 23 in order to position the tile 23 so that the drill perforates the recesses 24 between the corrugations 22. The drill 12 is in the center of valley 21 in the wheel 11 and towards one peripheral edge 25 of the drive wheel 11. The wheel 11 is mounted on its central axis by a bolt 26 and nut 27 to a subframe 28 as shown in FIG. 3.

The subframe 28 also supports the disc wheel 29 which intermittently contacts the driven bushings 16 on the drills 12 as the wheel 11 is rotated. The disc wheel 29 is mounted on a shaft 30 and preferably is made of a high friction material such as rubber on its peripheral surface 31. The bushings 16 can have a surface 16a which is made of a high friction material. The shaft 30 axis as viewed in the plan view in FIG. 1 is at an angle alpha to the axis of the drill 12. The preferred angle alpha is about 7°; however, any angle between about 5° and 90° will work so long as the drill 12 is moved into and through the sides of the pipe or tile 23.

Subframe 28 is C shaped so that legs 31 and 32 are parallel to each other. One leg 31 or 32 mounts the wheel 11 and the other mounts the drive disc 29 so that the disc 29 and wheel 11 are opposite each other and the bushings 16 periodically come into contact with the surface 29a of the disc 29. The shaft 30 is mounted in bearings 33 and 34 supported by parallel plates 35 and 36 attached to leg 32 of subframe 28. The shaft 30 has a pulley wheel 37 at the end opposite the disc 29 and mounts a belt 38 which is in turn attached to a pulley 39 on a motor 40 which is mounted on leg 32 opposite the plates 35 and 36 by bolts 41. The spacing between the legs 31 and 32 is maintained by a plate 42 which is also used to bolt the assembly to the walls 104 and 105 of the machine as described in FIGS. 5 and 6 by means of holes 43.

Figure 4:
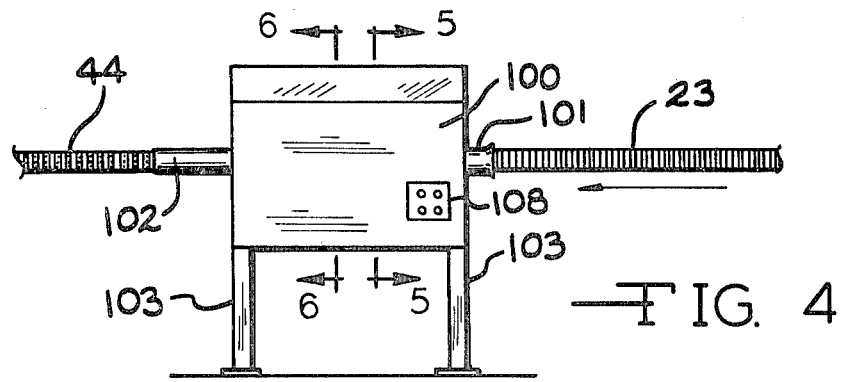
FIG. 4 is a front view of the preferred machine including inlet and outlet tubes for supporting the pipe or tile as it passes through the machine.
Figure 5:
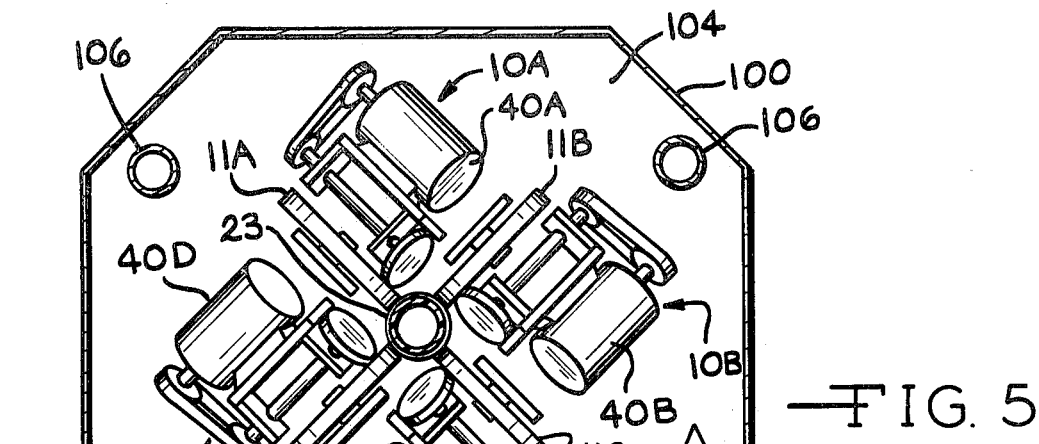
FIGS. 5 and 6 are end cross-sectional views along line 5—5 and 6—6 of FIG. 4 particularly illustrating the mounting of multiple guide wheel assemblies around a corrugated tube or tile such that there are two clusters of guide wheel assemblies each at 90° angles to each other around the pipe in a cluster and at 45° angles to each other around and along the pipe in the two clusters.
Figure 6:
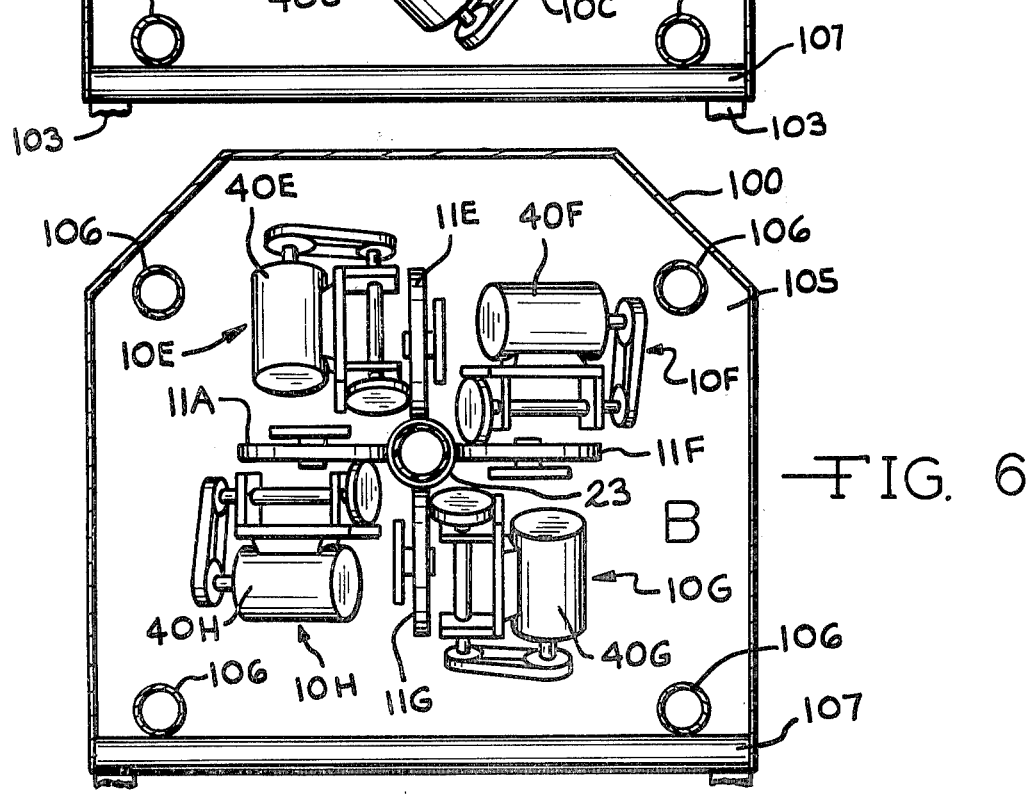

FIGS. 4 to 6 show one preferred form of the machine using multiple guide wheel assemblies such as shown in FIGS. 1 to 3. FIG. 4 shows the machine which includes a housing 100 with flared inlet tube 101 and exit tube 102 and mounted on legs 103. The sections in FIGS. 5 and 6 show two clusters A and B of four (4) guide wheel assemblies 10A to 10H which are identical except that the drive wheels 11E to 11H in cluster B are 45° radially offset as viewed in FIGS. 5 and 6 around the longitudinal axis of the tube 23 from the wheels 11A to 11D. This allows the holes 44 to be drilled in the pipe 23 at 45° angles around the longitudinal axis of the pipe 23. The assemblies 10A to 10H are bolted (not shown) on end plates 104 and 105 by means of plate 42 of subassembly 28 and holes 43 (FIG. 3). Pipes 106 between plates 104 and 105 and floor 107 form the support for the housing 100.

In operation pipe 23 is fed continuously and horizontally through the housing 100 by hand or by another machine (not shown), and is positioned by and between guide wheels 11A to 11H. The motors 40A to 40H are operated individually by a control panel 108 with appropriate electrical circuitry (not shown). As the drill 12 driven bushings 16 encounter the rotating drive discs 29, the drills 12 extend and rotate to perforate the pipe 23. After the discs 29 disengage from the bushings 16 the drills 12 are pulled from the pipe 23 as the pipe 23 progresses along its longitudinal axis horizontally through the housing 100. The drills 12 are set for minimum penetration into the pipe 23 so as to prevent them from bending or breaking when they are pulled from the pipe by the guide wheel 11.

Figure 7:
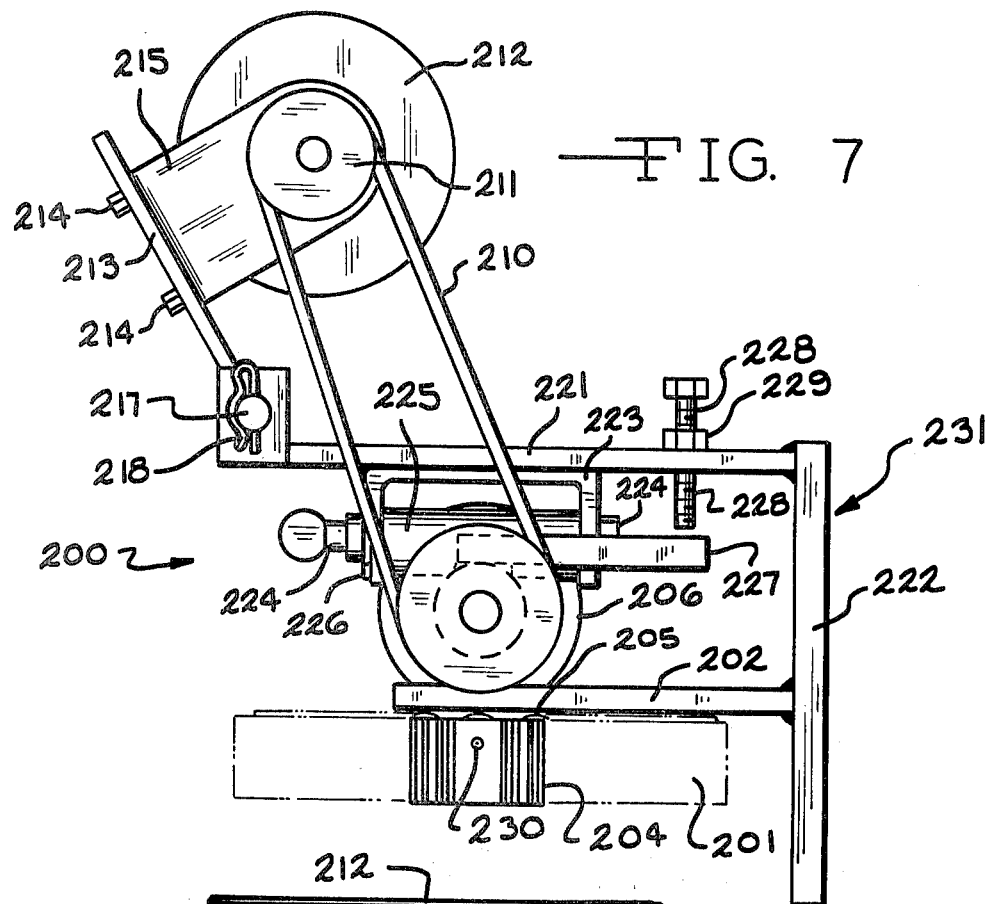
FIG. 7 is a front view and FIG. 8 is an end view of a preferred guide wheel assembly, wherein the weight of the motor tensions the belt and thus urges the drive disc into contact with driven bushings.
Figure 8:
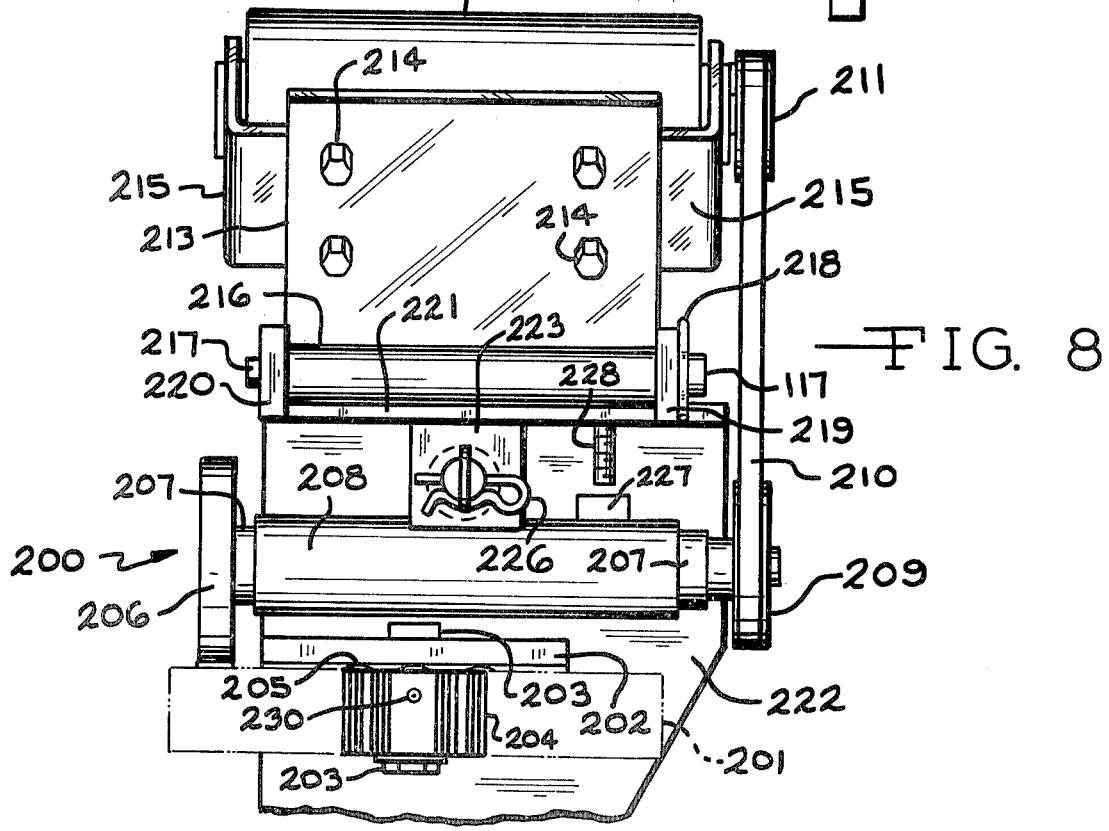

FIGS. 7 and 8 show the preferred guide wheel assembly 200. A guide wheel 201 is rotatably mounted on a leg 202 of a C shaped subframe 231 by means of a bolt and nut 203. The guide wheel 201 is identical in construction to the wheel 26 of FIGS. 1 to 3 and includes teeth 204 and driven bushings 205. A rotatable drive disc 206 with a rubber surface engages the bushings 205 (at an angle alpha of about 7° as in FIG. 1). The disc 206 is supported for rotation on a shaft 207 which is journalled in tube 208. A pulley wheel 209 is mounted at the opposite end of the shaft 207. The pulley wheel 207 supports a belt 210 which is mounted on a second pulley 211 on a motor 212. The motor 212 is mounted on a mounting plate 213 by bolts 214 and a mounting yoke 215. The mounting plate 213 is provided with an integral tubular extension 216 which is parallel to the longitudinal axis of the second pulley 211 and the axis of rotation of the motor 212. The motor mounting plate 213 is moveably attached by means of bolt 217 and pin 218 through the tubular extension 216. The pin 218 bears on plate 219 to guard against shearing. The bolt 217 is positioned through plate 219 and plate 220 which are mounted on a second leg 221 of the C shaped subframe 231. The legs 202 and 221 are joined by backing plate 222 and are parallel to each other. The drive disc 206 and tube 208 are pivotally mounted on the leg 221 by means of a U shaped member 223 and pin 224 in tube 225 such that tension on the pulley 210 urges the disc 206 into contact with the bushings 205. The pin 224 is held in place by key 226. A bar 227 is mounted on the tube 208 and extends perpendicular to the shaft 207 parallel to the plates 202 and 221. A positioning bolt 228 is mounted on the leg 221 and is locked in place by nut 229. The assembly is mounted to a frame (not shown) by means of backing plate 222 along with other assemblies as in FIGS. 5 and 6.

As can be seen from FIGS. 7 and 8, the weight of the motor 212 tensions the belt 210 and pivots the tube 208 such that the disc 206 engages the bushings 205. The pivotal axis of the plate 213 in the tubular extension 216 is sufficiently over center to a perpendicular line from the leg 221 to tension the belt 210 by the weight of the motor 212. The tension can be partially relieved if necessary by bolt 228 engaging bar 227 although usually this is not necessary. As in the assembly of FIGS. 1 to 3, the disc 206 drives the bushings 205 to extend the drills (not shown) from holes 230. The operation of the assembly in perforating drain tile has been previously described.

Figure 9:
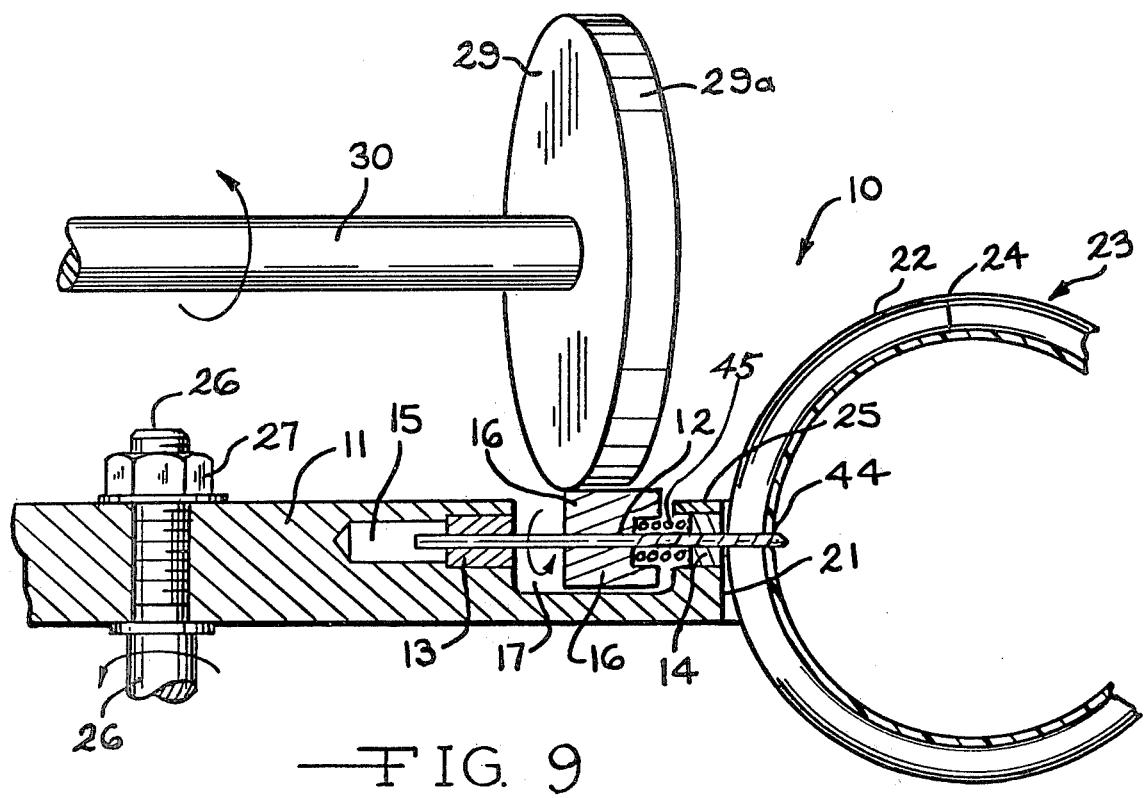
FIG. 9 is a front partial sectional view of an embodiment of the invention showing drill spring return means.

It will be obvious that the guide wheel 11 can have any peripheral surface configuration so long as it contacts the workpiece surface and so long as the drills 12 can be extracted from the surface after it perforates it. Preferably there is a space or valley between the periphery of the guide wheel 11 and the point of penetration into the surface of the workpiece. Return springs 45 could be used as shown in FIG. 9 around the drills 12 between the bushing 16 and the bushing 14 to allow for greater penetration and easier removal of the drills 12; however, shallow holes 44 such as in corrugated pipe 23 are preferred. Also, it will be obvious that some, but not all of the discs 29 in a cluster need be operated and the inoperative guide wheels 11 can merely rotate.

I claim:

1. In a machine for drilling holes in a workpiece and including a frame for supporting the workpiece, the improvement which comprises:
    (a) a guide wheel which rotates on a central axis with a peripheral surface positioned so as to be in surface contact with the workpiece as the workpiece advances through the frame;
    (b) at least one drill mounted on a radial axis from the central axis of the guide wheel such that the drill is rotatable and extendable into and retractable from the workpiece from the peripheral surface of the guide wheel;
    (c) a cylindrically surfaced driven bushing fixedly mounted on each drill around a radial axis; and
    (d) a rotatable powered drive disc mounted on the frame and having an axis of rotation transverse to said drill axis when the disc periodically frictionally engages each said bushing to rotate and axially extend each said drill with respect to said guide wheel into the workpiece to drill said workpiece and whereby upon rotation of the guide wheel each said drill is removed from each hole.

2. The machine of claim 1 wherein the drive disc has an axis of rotation which is between about 5° and 90° to a radial axis of the guide wheel and longitudinal axis of the drill when the bushing on the drill and disc are in contact.

3. The machine of claim 1 wherein there are a plurality of drills equally spaced about radial axes of the guide wheel.

4. The machine of claim 1 wherein the workpiece is cylindrical in cross-section with a longitudinal axis and there are a plurality of guide wheels positioned around the longitudinal axis of the workpiece.

5. The machine of claim 1 wherein the guide wheel has peripheral projections which cooperate with corresponding projections on the workpiece.

6. The machine of claim 1 wherein a return spring means is a spring mounted around the drill between the bushing and the guide wheel to remove each drill from each hole.

7. In a machine for drilling holes in corrugated tubing including a frame for supporting the tubing on its longitudinal axis, the improvement which comprises:
- (a) at least one guide wheel which rotates on a central axis mounted on the frame with the central axis of rotation perpendicular to the longitudinal axis of the tubing as supported in the frame and with a peripheral surface with projections which cooperate with the tubing corrugations to provide alignment of the tubing with the guide wheel during rotation;
- (b) a plurality of rotatable drills journalled on radial axes from the central axis and at equal angles around the guide wheel so as to be extendable and retractable from between the projections on the guide wheel into the tubing;
- (c) cylindrically surfaced driven bushings fixedly mounted on each of the drills around a radial axis; and
- (d) a rotatable powered drive disc mounted on the frame and having an axis for rotation transverse to said drill axis when the disc periodically frictionally engages each said bushing to rotate and axially extend each said drill with respect to said guide wheel into the pipe to drill said pipe and whereby the rotation of the guide wheel removes each said drill from each hole.

8. The machine of claim 7 wherein at least one of the drive disc or bushings has an engaging surface which is composed of a high friction material.

9. The machine of claim 7 wherein the guide wheel projections are regularly spaced gear teeth which cooperate with the corrugations on tubing so as to drill a hole between peaks in the corrugations.

10. The machine of claim 7 wherein there are a plurality of guide wheels equally spaced around the longitudinal axis of the tubing.

11. The machine of claim 10 wherein there are two sets of guide wheels spaced from each other along the longitudinal axis position of the tubing in the frame.

12. The method of drilling a hole in a workpiece which comprises:
- (a) providing a guide wheel which rotates on a central axis with a peripheral surface positioned so as to be in surface contact with the workpiece, the guide wheel having at least one drill mounted on a radial axis from the central axis of the guide wheel such that the drill is rotatable and extendable into and retractable from the workpiece from the peripheral surface of the guide wheel and the drills having cylindrically surfaced driven bushings fixedly mounted around a radial axis of each drill;
- (b) providing a rotatable powered drive disc with an axis of rotation positioned transversely to said drill axis so ythat the disc periodically frictionally engages each said bushing to rotate and axially extend each said drill with respect to said guide wheel into the workpiece to drill said workpiece and whereby upon the rotation of the guide wheel each said drill is removed from each hole; and
- (c) moving the workpiece surface and the guide wheel relative to each other so as to drill the hole.

* * * * *